(12) United States Patent
Brown et al.

(10) Patent No.: US 10,029,622 B2
(45) Date of Patent: Jul. 24, 2018

(54) SELF-CALIBRATION OF A STATIC CAMERA FROM VEHICLE INFORMATION

(71) Applicant: International Business Machines Corporation, Armonk, NY (US)

(72) Inventors: Lisa M. Brown, Pleasantville, NY (US); Quanfu Fan, Somerville, MA (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 14/807,448

(22) Filed: Jul. 23, 2015

(65) Prior Publication Data

US 2017/0024889 A1    Jan. 26, 2017

(51) Int. Cl.
*G06T 7/00*    (2017.01)
*G06K 9/00*    (2006.01)
(Continued)

(52) U.S. Cl.
CPC ............. *B60R 11/04* (2013.01); *B60R 1/00* (2013.01); *G06K 9/00785* (2013.01);
(Continued)

(58) Field of Classification Search
CPC ..... B60R 11/04; B60R 1/00; B60R 2300/402; G06K 9/00785; G06K 9/6256;
(Continued)

(56) References Cited

U.S. PATENT DOCUMENTS

2006/0177099 A1* 8/2006 Zhu ................... G06K 9/00335
382/104
2009/0315996 A1* 12/2009 Guler ..................... G01S 3/7864
348/169
(Continued)

OTHER PUBLICATIONS

511NJ, "Camera List," 511nj.org Traffic Cameras, p. 1, http://www.511nj.org/cameras.aspx?default=NJ Turnpike Tour, Accessed on Jun. 18, 2015.
(Continued)

*Primary Examiner* — William C Vaughn, Jr.
*Assistant Examiner* — Naod Belai
(74) *Attorney, Agent, or Firm* — Patricia B. Feighan (57) ABSTRACT

A method to automatically calibrate a static camera in a vehicle is provided. The method may include receiving a captured image file. The method may also include detecting a plurality of vehicles in the captured image file. The method may further include determining a 2D projected shape, size, location, direction of travel, and a plurality of features for each vehicle at various locations in the captured image file. The method may additionally include inferring a plurality of geometry scenes associated with the captured image file, whereby the plurality of geometry scenes is inferred based on the determined 2D projected shape, size, location, direction of travel, and the plurality of features of each vehicle within the detected plurality of vehicles as projected onto the captured image file. The method may include calibrating the static camera based on the inferred plurality of geometry scenes associated with the captured image file.

20 Claims, 8 Drawing Sheets

(51) Int. Cl.
*B60R 11/04* (2006.01)
*G06K 9/46* (2006.01)
*G06T 7/80* (2017.01)
*G06T 7/73* (2017.01)
*G06T 7/246* (2017.01)
*B60R 1/00* (2006.01)
*G06K 9/62* (2006.01)

(52) U.S. Cl.
CPC ............ *G06K 9/6256* (2013.01); *G06T 7/246* (2017.01); *G06T 7/73* (2017.01); *G06T 7/80* (2017.01); *B60R 2300/402* (2013.01); *G06T 2207/30236* (2013.01); *G06T 2207/30252* (2013.01)

(58) Field of Classification Search
CPC . G06T 2207/30236; G06T 2207/30252; G06T 7/246; G06T 7/73; G06T 7/80
USPC .......................................................... 348/148
See application file for complete search history.

(56) References Cited

U.S. PATENT DOCUMENTS

2013/0169822 A1* 7/2013 Zhu ....................... G06T 7/0018
348/180
2014/0043329 A1* 2/2014 Wang ..................... G06T 17/20
345/420

OTHER PUBLICATIONS

Bose et al., "Ground Plane Rectification by Tracking Moving Objects," IEEE International Workshop on Visual Surveillance and PETS, 2004, p. 1-8.

Brown et al., "Temporal Non-Maximum Suppression for Pedestrian Detection using Self-Calibration," 22nd International Conference on Pattern Recognition, 2014, p. 2239-2244, IEEE Computer Society.

Consumer Reports, "Exterior & Cargo," Car Dimensions, p. 1-7, http://www.consumerreports.org/cro/cars/types/exterior-and-cargo-comparison.htm, Accessed on Jun. 18, 2015.

Hödlmoser et al., "Camera Auto-Calibration Using Pedestrians and Zebra-Crossings," IEEE International Conference on Computer Vision Workshops, 2011, p. 1697-1704.

Hoiem et al., "Putting Objects in Perspective," International Journal of Computer Vision, 2008, p. 3-15, vol. 80, Issue 1, Springer Science+Business Media.

Liu et al., "Surveillance Camera Autocalibration based on Pedestrian Height Distributions," British Machine Vision Conference (BMVC), 2011, p. 1-11.

Lv et al., "Camera Calibration from Video of a Walking Human," IEEE Transactions on Pattern Analysis and Machine Intelligence, Sep. 2006, p. 1513-1518, vol. 28, No. 9, IEEE Computer Society.

Mell et al., "The NIST Definition of Cloud Computing," National Institute of Standards and Technology, Sep. 2011, p. 1-3, Special Publication 800-145.

Pan et al., "Coherent Object Detection with 3D Geometric Context from a Single Image," IEEE International Conference on Computer Vision, 2013, p. 2576-2583, IEEE Computer Society.

Pflugfelder et al., "Online auto-calibration in man-made worlds," Proceedings of the Digital Imaging Computing: Techniques and Applications (DICTA), 2005, 8 Pages, IEEE Computer Society.

Richardson et al., "Scene Geometry from Moving Objects," 11th IEEE International Conference on Advanced Video and Signal Based Surveillance (AVSS), 2014, p. 13-18.

Rujikietgumjorn et al., "Optimized Pedestrian Detection for Multiple and Occluded People," IEEE Conference on Computer Vision and Pattern Recognition, 2013, p. 3690-3697, IEEE Computer Society.

Tardif, "Non-Iterative Approach for Fast and Accurate Vanishing Point Detection," IEEE 12th International Conference on Computer Vision (ICCV), 2009, p. 1250-1257.

Tretyak et al., "Geometric Image Parsing in Man-Made Environments," International Journal of Computer Vision, May 2012, p. 305-321, vol. 97, Issue 3, Springer Science+Business Media.

* cited by examiner

SELF-CALIBRATION OF A STATIC CAMERA FROM VEHICLE INFORMATION

BACKGROUND

The present invention relates generally to the field of computers, and more particularly to the calibration of a static camera.

Calibration information can greatly improve capabilities in a surveillance system. It can be used in almost every functional step including constraining object detection and tracking, informing object classification, and providing useful metric information for retrieval. Self-calibration of static cameras is typically based on assumptions about objects in a scene with a known size, position, or speed.

SUMMARY

According to one embodiment, a method to automatically calibrate a static camera in a vehicle is provided. The method may include receiving a captured image file. The method may also include detecting a plurality of vehicles in the captured image file. The method may further include determining a 2D projected shape, size, location, direction of travel, and a plurality of features for each vehicle within the detected plurality vehicles at various locations in the captured image file. The method may additionally include inferring a plurality of geometry scenes associated with the captured image file, whereby the plurality of geometry scenes is inferred based on the determined 2D projected shape, size, location, direction of travel, and the plurality of features of each vehicle within the detected plurality of vehicles as projected onto the captured image file. The method may include calibrating the static camera based on the inferred plurality of geometry scenes associated with the captured image file.

According to another embodiment, a computer system to automatically calibrate a static camera in a vehicle is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a captured image file. The method may also include detecting a plurality of vehicles in the captured image file. The method may further include determining a 2D projected shape, size, location, direction of travel, and a plurality of features for each vehicle within the detected plurality vehicles at various locations in the captured image file. The method may additionally include inferring a plurality of geometry scenes associated with the captured image file, whereby the plurality of geometry scenes is inferred based on the determined 2D projected shape, size, location, direction of travel, and the plurality of features of each vehicle within the detected plurality of vehicles as projected onto the captured image file. The method may include calibrating the static camera based on the inferred plurality of geometry scenes associated with the captured image file.

According to yet another embodiment, a computer program to automatically calibrate a static camera in a vehicle is provided. The computer program product may include one or more computer-readable storage devices and program instructions stored on at least one of the one or more tangible storage devices, the program instructions executable by a processor. The computer program product may include program instructions to receive a captured image file. The computer program product may also include program instructions to detect a plurality of vehicles in the captured image file. The computer program product may further include program instructions to determine a 2D projected shape, size, location, direction of travel, and a plurality of features for each vehicle within the detected plurality vehicles at various locations in the captured image file. The computer program product may additionally include program instructions to infer a plurality of geometry scenes associated with the captured image file, whereby the plurality of geometry scenes is inferred based on the determined 2D projected shape, size, location, direction of travel, and the plurality of features of each vehicle within the detected plurality of vehicles as projected onto the captured image file. The computer program product may include program instructions to calibrate the static camera based on the inferred plurality of geometry scenes associated with the captured image file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to the calibration of a static camera. The following described exemplary embodiments provide a system, method and program product to, among other things, self-calibrate a static camera based on vehicle information. Therefore, the present embodiment has the capacity to improve the technical field of calibration by providing a method to calibrate a static camera using information obtained regarding vehicles in a captured scene (i.e., image), such as the simple size and pose information of the vehicles in the scene. More specifically, the present embodiment may leverage the vehicle pose information to infer the height of the camera and the tilt of the camera to the ground based on the variation in the projection of a 3D model of a canonical vehicle.

According to at least one implementation, the present embodiment provides a method to automatically calibrate a static camera using information regarding the vehicles in a captured scene. The present embodiment may use standard Adaboost (an algorithm for constructing a "strong" classifier as linear of "simple" "weak" classifiers) vehicle detection combined with feature-based tracking to determine the size and direction of travel of vehicles at various locations in the scene. Then, the scene geometry including the height of the camera, the camera focal length, and the angle of the camera with respect to the ground is inferred. Thus, given the calibration, the present embodiment may estimate the size and speed of objects and the distances travelled in the scene. As such, the present embodiment may be used to accurately estimate vehicle sizes to within 2 feet for a range of camera configuration.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product self-calibrate a static camera based on vehicle information. According to at least one implementation, the present embodiment may utilize vehicle information to self-calibrate a camera. For example, there are many surveillance applications which consider roads, intersections and highways. The primary events captured by such surveillance applications are typically the vehicles passing by. Over time, many hundreds or thousands of vehicles may traverse the scene. According to at least one implementation of the present embodiment, such captured information may be used to self-calibrate the camera. As such, using existing technology, such as, but not limited to foreground detection, pose-dependent vehicle detection, and feature based tracking, the present embodiment may infer an estimate of the pose and size of each vehicle. Then, assuming a known distribution of the vehicle size and shape in the real-world, the present embodiment my implement a method to self-calibrate the camera. According to the present embodiment, from this calibration, it may be possible to estimate the length, the distance traveled, and speed of each vehicle.

Figure 1:
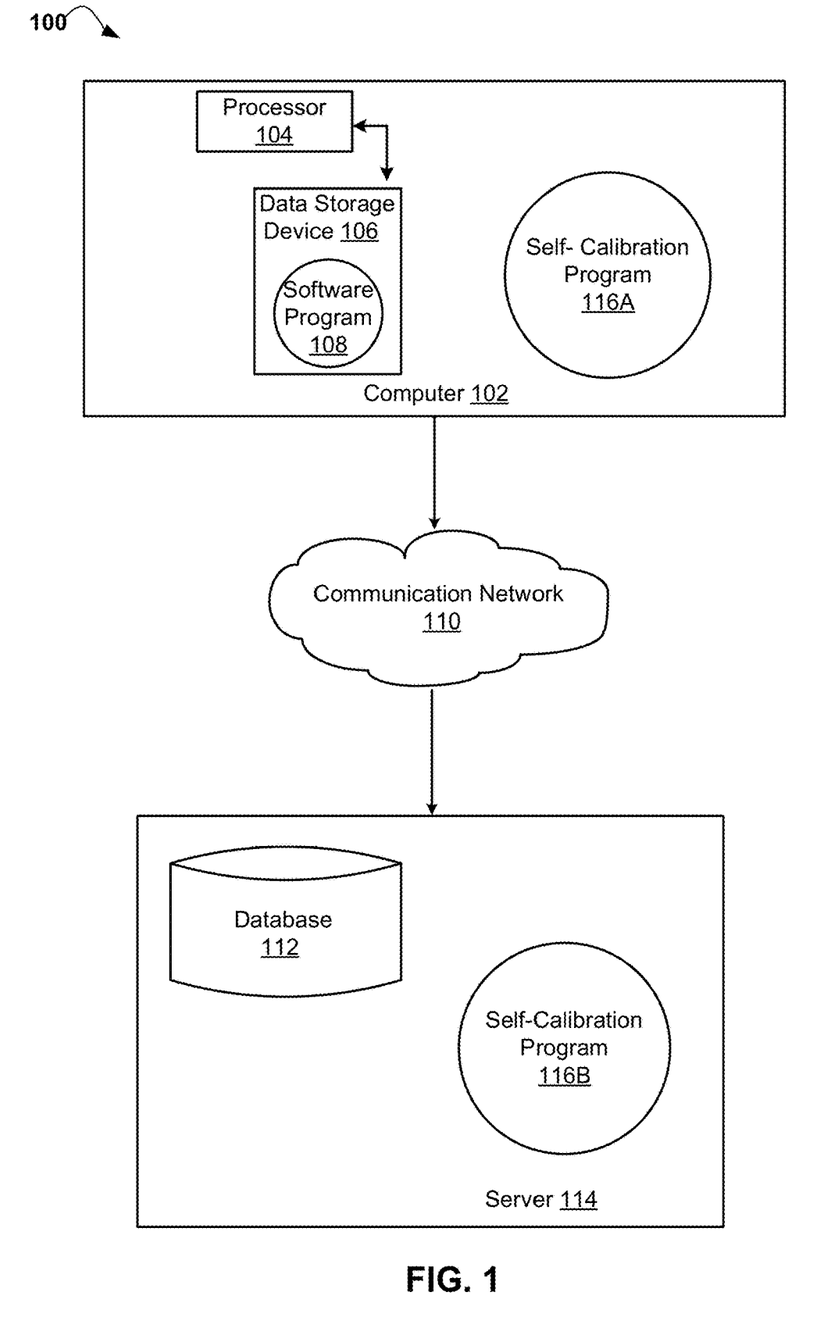
FIG. 1 illustrates a networked computer environment according to at least one embodiment.

Referring to FIG. 1, an exemplary networked computer environment 100 in accordance with one embodiment is depicted. The networked computer environment 100 may include a computer 102, a processor 104, and a data storage device 106 that is enabled to run a software program 108 and a Self-Calibration Program 116A. The networked computer environment 100 may also include a server 114 that is enabled to run a Self-Calibration Program 116B that may interact with a database 112 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computers 102 may communicate with the Self-Calibration Program 116B running on server computer 114 via the communications network 110. The communications network 110 may include connections, such as wire, wireless communication links, or fiber optic cables. As will be discussed with reference to FIG. 5, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, a camera, or any type of computing devices capable of running a program, accessing a network, and accessing a database 112. According to various implementations of the present embodiment, the Self-Calibration Program 116A, 116B may interact with a database 112 that may be embedded in various storage devices, such as, but not limited to a computer 102, a networked server 114, or a cloud storage service.

As previously described, the client computer 102 may access the Self-Calibration Program 116B, running on server computer 114 via the communications network 110. For example the Self-Calibration Program 116A, 116B running on a client computer 102 may be utilized to automatically enable self-calibration of a static camera 102 from vehicle information. The Self-Calibration method is explained in more detail below with respect to FIGS. 2-4.

Figure 2:
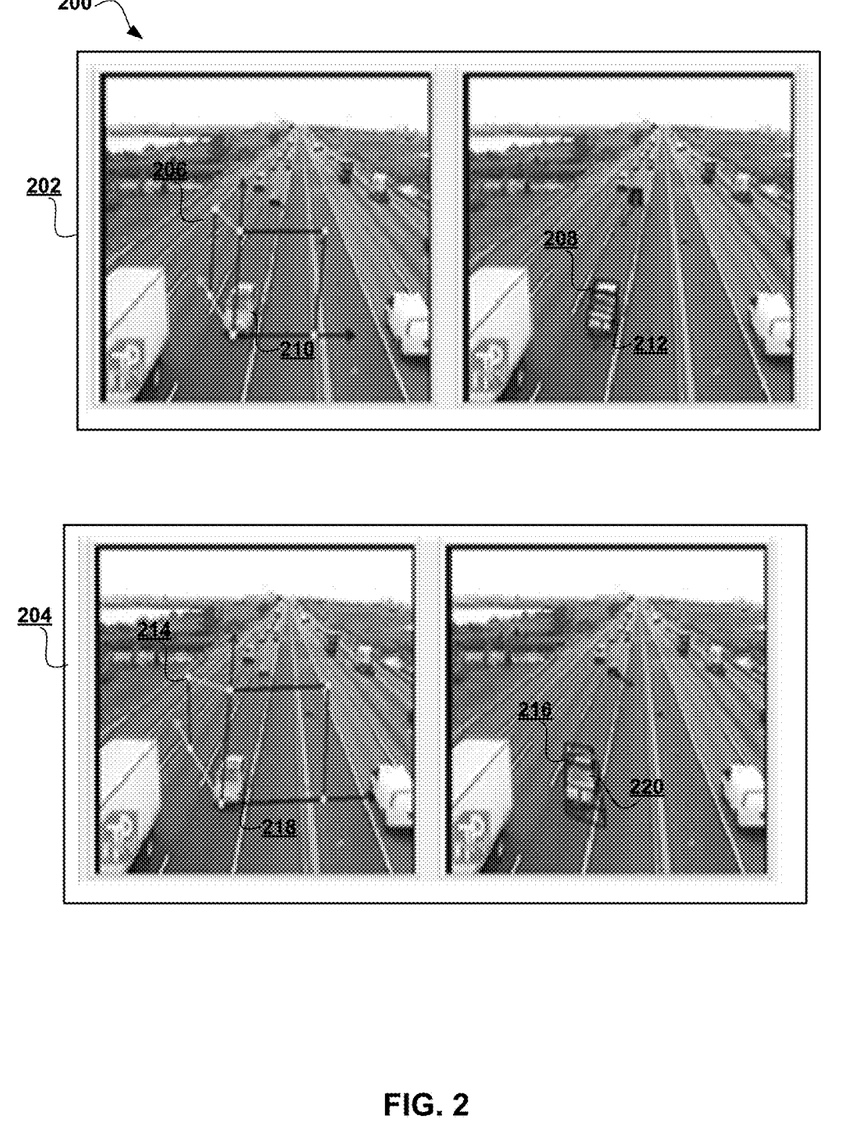
FIG. 2 is an exemplary illustration of camera models according to at least one embodiment.

Referring now to FIG. 2, an exemplary illustration 200 of camera models in accordance with one embodiment is depicted. FIG. 2 shows two examples 202, 204 of potential camera models (or calibration parameters) and their respective projections of a sedan wireframe model 206 overlaid on a frame (i.e., captured scene or image) of a video. In the top row 202, the automatic calibration of the cube with reasonable settings shows projected vehicle wireframes 206, 208 overlaid on vehicles in the image 210, 212 with appropriate projections. As such, in the top row 202, the model 206, 208 fits very closely to the image of the vehicle 210, 212. Conversely, in the bottom row 204, due to the inaccurate calibration of cube, the wireframe projections do not align with image of vehicles 218, 220 and therefore, the model 214, 216 does not fit. According to at least one implementation, the camera model 206, 208 which projects a simple vehicle model 206, 208 onto the bounding boxes of vehicle detections most closely (e.g., top row 202) would be determined and used by the present embodiment.

Figure 3:
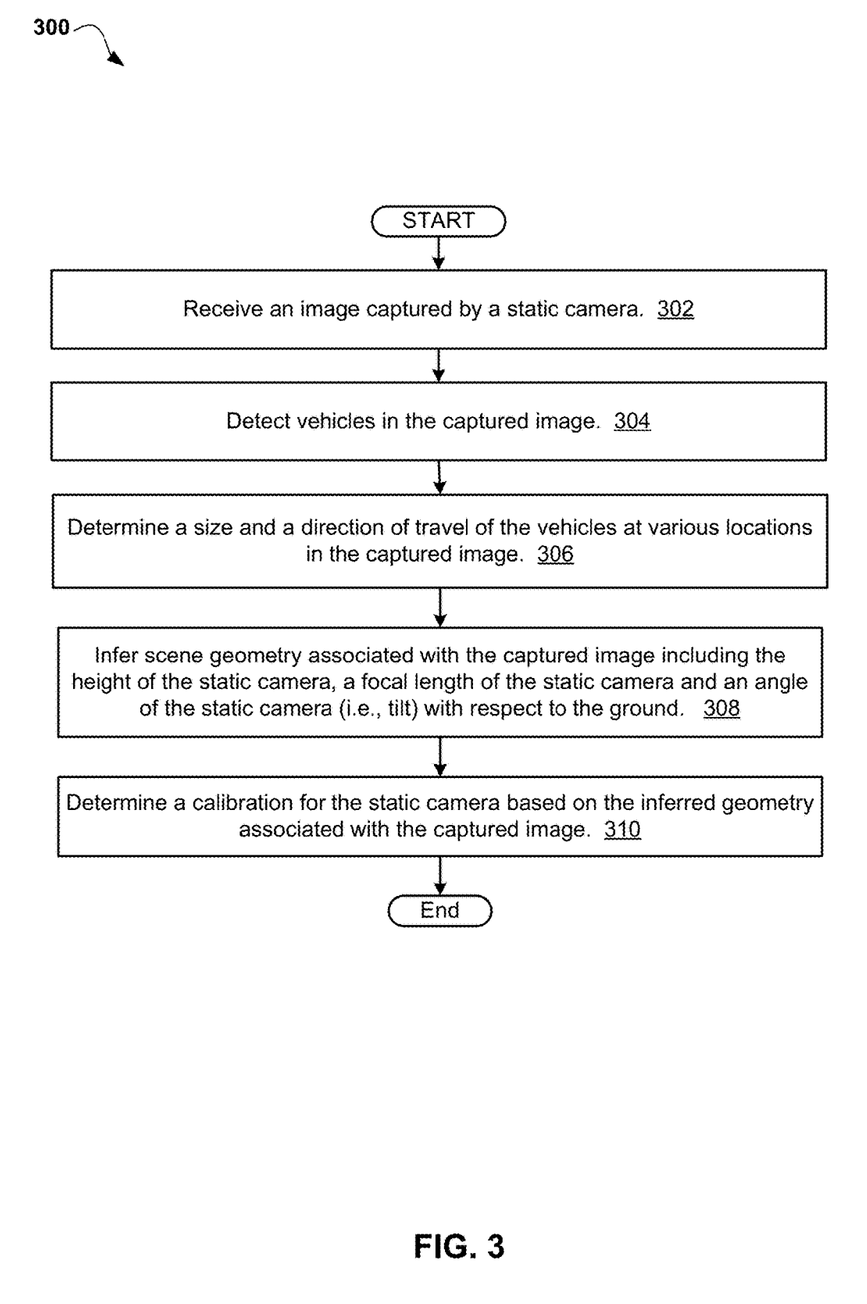
FIG. 3 is an operational flowchart illustrating the steps carried out by a program that enables automatic calibration of a static camera according to at least one embodiment.

Referring now to FIG. 3, an operational flowchart 300 illustrating the steps carried out by a program that enables automatic self-calibration of a static camera 102 (FIG. 1) from vehicle information in accordance with one embodiment is depicted. As previously described, the Self-Calibration Program 116A, 116B (FIG. 1) may automatically calibrate a static camera using information regarding the vehicles in a captured scene. The scene geometry including the height of the camera, the camera focal length, and the angle of the camera with respect to the ground is inferred.

Thus, given the calibration, the present embodiment may estimate the size and speed of objects and the distances travelled in the scene.

More specifically, the present embodiment processes a captured image file (i.e., captured image and/or video) that includes a camera feed, a video from a static camera, a set of images from the same camera that hasn't moved, or a single image to 'infer' the geometry (i.e., the calibration). As such, the present embodiment uses the size (i.e., the shape) of the vehicle in the scene as projected onto the image from its location in the 3D world and its direction of travel. Therefore, the scene geometry is inferred based on the determined 2D projected shape, size, location, direction of travel, and the features of each vehicle. This projection is different depending on the camera calibration parameters and the present embodiment uses this projection to infer the parameters. Although the present embodiment assumes information about the specific size or distribution of sizes of vehicles in the scene, nothing is assumed about the roads in the scene, as there can be multiple roads, in multiple directions and the roads can be straight or curving in any way. Furthermore, the vehicle size or shape may be obtained from any existing method, including, but not limited to vehicle detection, background subtraction, object classification etc.

According to at least one implementation, the present embodiment may assume a pin-hole camera model with three parameters: the height of the camera, $H_c$, above the (assumed horizontal and flat) ground plane; the camera tilt, $\theta_c$, as measured from the downward vertical; and the focal length, F—the distance from the camera center to the notional image plane. Also, it may be assumed that the camera has no roll, that its pixel aspect ratio is 1:1, and that, by convention, it faces in the world-Z direction and the origin of the world projects onto the center of the image plane. As such, based on these choices and assumptions, "calibrating the camera" as described herein consists of determining the three parameters, $H_c$, $\theta_c$, and F.

In overview, the camera may be calibrated by finding the values for these parameters ($H_c$, $\theta_c$, and F) that best fit a large number of vehicle detections. A vehicle detection is given by a bounding box in the image together with the vehicle's pose—the direction the vehicle is facing. Each vehicle is taken to rest horizontally on the ground plane and is modelled as a rectangular prism of fixed fiducial size. For a given detection and set of camera parameters, the present embodiment may determine the location of the vehicle on the world ground plane (keeping the vehicle's pose and fiducial size unchanged) for which the vehicle's image best matches the detection's bounding box. The set of camera parameters that give the best bounding-box fits in aggregate is the camera calibration.

Therefore, at 302, an image captured by a static camera is received. As previously described, there are many surveillance applications which consider roads, intersections and highways. The primary events captured by such surveillance applications are typically the vehicles passing by. According to at least one implementation of the present embodiment a captured image or video from such surveillance applications is received and the information obtained from the captured image or video may be used to self-calibrate the camera.

Next, at 304 vehicles in the captured image or video are detected. As previously explained, a vehicle detection is given by a bounding box in the image together with the vehicle's pose—the direction the vehicle is facing. Each vehicle is taken to rest horizontally on the ground plane and is modelled as a rectangular prism of fixed fiducial size.

According to at least one implementation, the present embodiment may use standard Adaboost (an algorithm for constructing a "strong" classifier as linear of "simple" "weak" classifiers) for the vehicle detection.

Then at 306, a size and a direction of travel of the vehicles is determined at various locations in the captured image or video. As such, the present embodiment will determine a 2D projected shape, size, location, direction of travel, as well as other features for each detected vehicle at various locations in the captured image or video. According to at least one implementation and as previously described, the present embodiment may use feature-based tracking (combined with the standard Adaboost vehicle detection) to determine the size and direction of travel of vehicles at various locations in the scene. Therefore, the vehicle size or shape may be obtained from any existing method, including, but not limited to vehicle detection, background subtraction, object classification etc.

Next at 308, scene geometry associated with the captured image or video is inferred. The scene geometry includes the height ($H_c$) of the static camera, a focal length of the static camera (F) and an angle of the static camera (i.e., tilt $\theta_c$) with respect to the ground. As previously described, the present embodiment uses the size (i.e., the shape) of the vehicle in the scene as projected onto the image from its location in the 3D world and its direction of travel. This projection is different depending on the camera calibration parameters and the present embodiment uses this projection to infer the parameters. Implementation details regarding how the three camera parameters ($H_c$, $\theta_c$, and F) are used to determine the mapping between the 3D world and the 2D image is explained in more detail below with respect to FIGS. 4A-4B.

Then at 310, a calibration for the static camera based on the inferred geometry associated with the captured image or video is determined. The present embodiment enables a static camera to automatically calibrate using the size and pose information of the vehicles in the captured image or video. Thus, given the calibration, the present embodiment may estimate the size and speed of objects and the distances travelled in the scene. As such, the present embodiment may be used to estimate vehicle sizes to within 2 feet for a range of camera configuration.

The camera is calibrated by finding the values for the camera parameters that best fit the large number of vehicle detections. As previously described with respect to step 304, a vehicle detection is given by a bounding box in the image together with the vehicle's pose—the direction the vehicle is facing. Each vehicle is taken to rest horizontally on the ground plane and is modelled as a rectangular prism of fixed fiducial size. For a given detection and set of camera parameters, the location of the vehicle on the world ground plane is determined (keeping the vehicle's pose and fiducial size unchanged) for which the vehicle's image best matches the detection's bounding box. The set of camera parameters that give the best bounding-box fits in aggregate is the camera calibration.

Figure 4A:
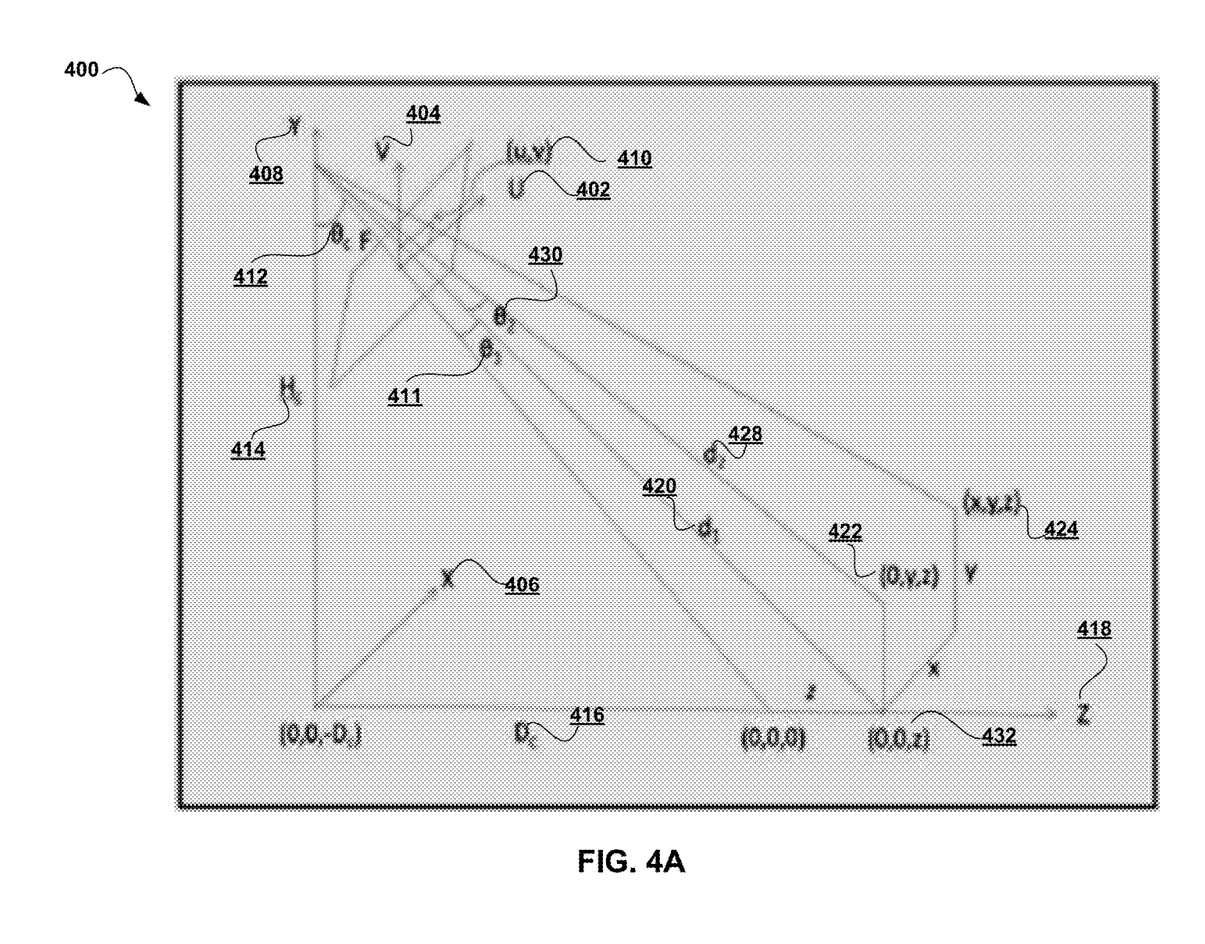
FIGS. 4A-4B is an exemplary illustration of the three pin-hole camera parameters (i.e, camera height, tilt, and focal length) and examples of detection according to at least one embodiment.
Figure 4B:
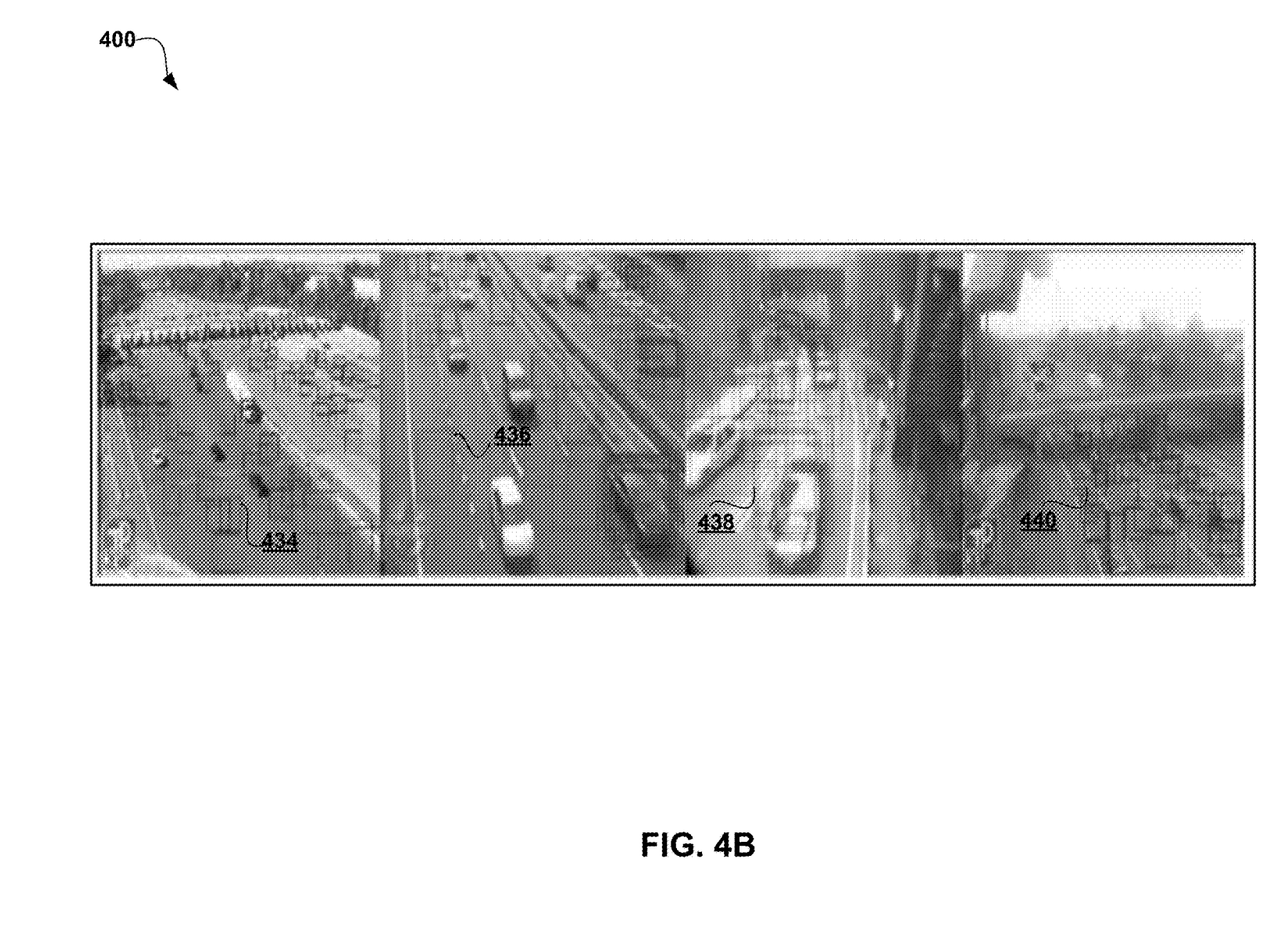

Referring now to FIGS. 4A-4B, an exemplary illustration 400 of the three pin-hole camera parameters (i.e., camera height, tilt, and focal length) and examples of detections in accordance with one embodiment is depicted. FIG. 4A illustrates how the three camera parameters ($H_c$, $\theta_c$, and F) are used to determine the mapping between the 3D world and the 2D image. According to the present embodiment, the horizontal image axes, U 402 and V 404, align with the transverse and vertical world axes, X 406 and Y 408. Then, for a given point (u,v) 410 in the image, the present embodiment will find the corresponding point on the ground plane (x,0,z) in the world, for example, as follows:

Let $\theta_1$ (411) be the angle between the center of the image and the vertical coordinate v 404 with respect to the center of the camera, $$\theta_1 = \operatorname{atan}\left(\frac{v}{c}\right).$$

From the height of the camera $H_c$ 414 and tilt angle $\theta_c$ 412 the present embodiment determines that the distance to the world origin (Dc 416) is $$D_c = H_c \tan(\theta_c).$$

The z coordinate 418 of the point on the ground plane is $$z = H_c \tan(\theta_c + \theta_1) - D_c.$$

Let $d_1$ (420) be the distance from the camera center to point on the ground which is located at (0,0,z) 432 and G be the corresponding distance from the camera center to point on the image at (0,v), then $$d_1 = \sqrt{H_c^2 + (D_c + z)^2}$$
$$G = \sqrt{F^2 + v^2}$$
$$x = \frac{d_2}{G} u$$

Given a point on the image (u,v) 410, the present embodiment determines the corresponding point on the ground plane (x,0,z). The present embodiment models a normative mid-sized vehicle as a 3D rectangular prism with length $L_v=15$ feet, width $W_v=6$ feet and height $H_v=5$ feet. These dimensions are based on the average car sizes from the most recent (2015) consumer reports vehicle exterior and cargo comparison chart, such as (http://www.consumerreports.org/cro/cars/types/exterior-and-cargo-comparison.htm). The standard deviation for the length is 12 inches, for the width 2.8 inches and for the height 4.7 inches.

As such, the present embodiment computes the eight 3D vertices of the vehicle prism at a known pose n and the given location of the closest vertex at (x,0,z) using the above dimensions and straightforward geometry. For each 3D point (x,y,z) 424, the present embodiment projects back onto the image plane to get (u,v) 410 according to similar principles as previously described. Let $d_2$ 428 be the distance from the camera center to the point (0,y,z) 422 and $\theta_z$ 430 be the angle between the point (0,y,z) 422 and the point (0,0,z) 432 with respect to the camera center, then the present embodiment computes the projection of (x,y,z) 424 onto the image according to:

$$d_2 = \sqrt{(H_c - y)^2 + (D_c + z)^2}$$
$$\theta_2 = \operatorname{atan}\left(\frac{D_c + z}{H_c - y}\right)$$
$$v = F * \tan(\theta_2 - \theta_c)$$
$$G_2 = \sqrt{F^2 + v^2}$$
$$u = x G_2 / d_2.$$

Then, from the projection of the 3D vehicle model onto the image, the present embodiment can determine the bounding box which contains these points.

Furthermore, to find the optimal camera model, the present embodiment may use a large set of vehicle detections as input to the system. Examples of these detections are shown in FIG. 4B. For each detection, the bounding box 434-440 and the direction of travel is used. The direction of travel can be found using the tracking output. Outliers are removed from this set based on a linear mapping which estimates the height of a vehicle at each location in the image.

According to at least one implementation, the detection system is composed of 12 Adaboost detectors trained on standard vehicles at different poses ranging every 30 degrees from driving toward the camera, to the left, away from the camera and to the right. Although pose information may be determined from the detection system, direction of travel appears to be more reliable for several reasons. For most traffic scenes there is only one or two primary directions of travel. Since the majority of road segments are fairly straight, the present embodiment may determine the primary travel directions. Pose, on the other hand changes as the vehicle moves and differs with respect to the position of the vehicle with respect to the camera. Therefore, by using direction of travel, the present embodiment may decouple the dependence of position on camera model. In this way, pose may be determined based on a camera model estimate, and the best camera model may be found which explains the size of bounding boxes at each location.

To quantify the goodness-of-fit of a set of camera parameters, the present embodiment may measure how accurately the bounding boxes 434-440 encompass the projections of the vehicle models moving in the specified directions. The rectangular prism model of a vehicle and its direction of travel is projected onto the image in the bounding box 434-440. Then, the optimal position to minimize the box fit is determined. The present embodiment defines the optimal box fit to minimize the Euclidean sum of the difference of the left coordinates, $\delta_L$ and right coordinates, $\delta_R$ $$\sqrt{\delta_L^2 + \delta_r^2}.$$

Additionally, for each camera model, the present embodiment evaluates the overall fit based on differences of the heights and widths of the input bounding boxes and the estimated bounding boxes from projecting the rectangular prism at the given location with the given pose. To do this, the present embodiment uses a robust nonlinear regression model with an initial estimate of the camera model of ($H_c=20$ feet, $\theta_c=60$ degrees, F=Image Height) and a termination tolerance for the parameters of 1e-4. The error function that is minimized is the root mean square deviation between the ground truth (G) detection widths (W) and heights (H) and the predicted (P), $$\sqrt{\Sigma_i^n ((H_i^G - H_i^P)^2 + (W_i^G - W_i^P)^2)/n}.$$

It may be appreciated that FIGS. 2-4B provide only an illustration of one implementation and does not imply any limitations with regard to how different embodiments may be implemented. Many modifications to the depicted environments may be made based on design and implementation requirements. As previously mentioned, the present embodiment implements a self-calibration scheme to utilize the 3D information inherent in vehicle projections to calibrate a range of traffic and surveillance cameras. By measuring only the bounding box of the vehicles in the scene and estimating the direction of travel, the present embodiment can predict a camera model including focal length, camera height and camera tilt angle. As such, the model may be used for measuring the 3D size and speed of objects in the scene.

Calibration information can greatly improve capabilities in a surveillance system. It can be used in almost every functional step including constraining object detection and tracking, informing object classification, and providing useful metric information for retrieval. As previously described, the present embodiment enables a static camera to automatically calibrate using simple size and pose information of vehicles in the scene. By leveraging vehicle pose information, the present embodiment can infer the height of the camera and the tilt of the camera to the ground based on the variation in the projection of a simple 3D model of a canonical vehicle.

Figure 5:
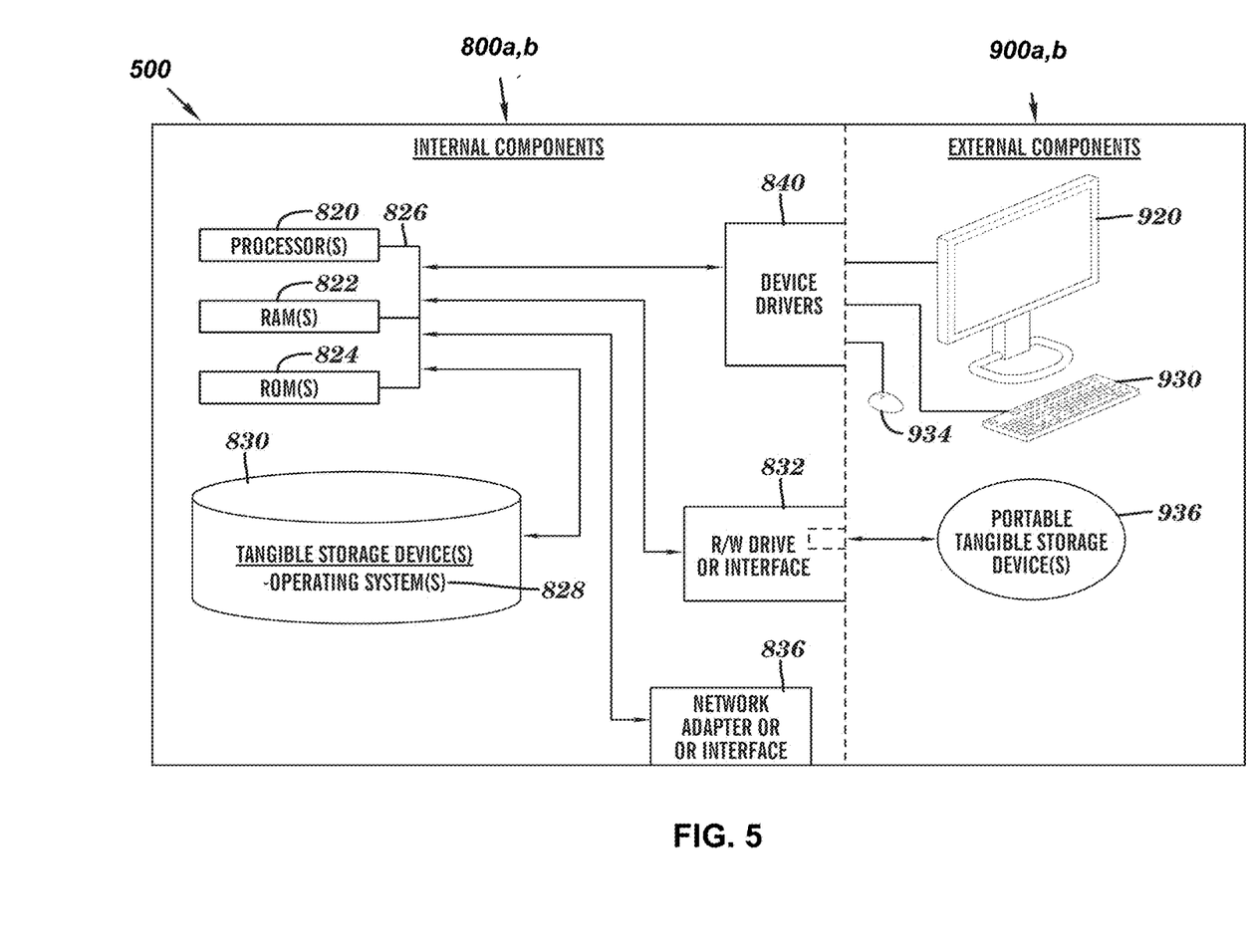
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 5. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Self-Calibration Program 116A (FIG. 1) in client computer 102 (FIG. 1) and the Self-Calibration Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Self-Calibration Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Self-Calibration Program 116A (FIG. 1) in client computer 102 (FIG. 1) and the Self-Calibration Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Self-Calibration Program 116A (FIG. 1) in client computer 102 (FIG. 1) and the Self-Calibration Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
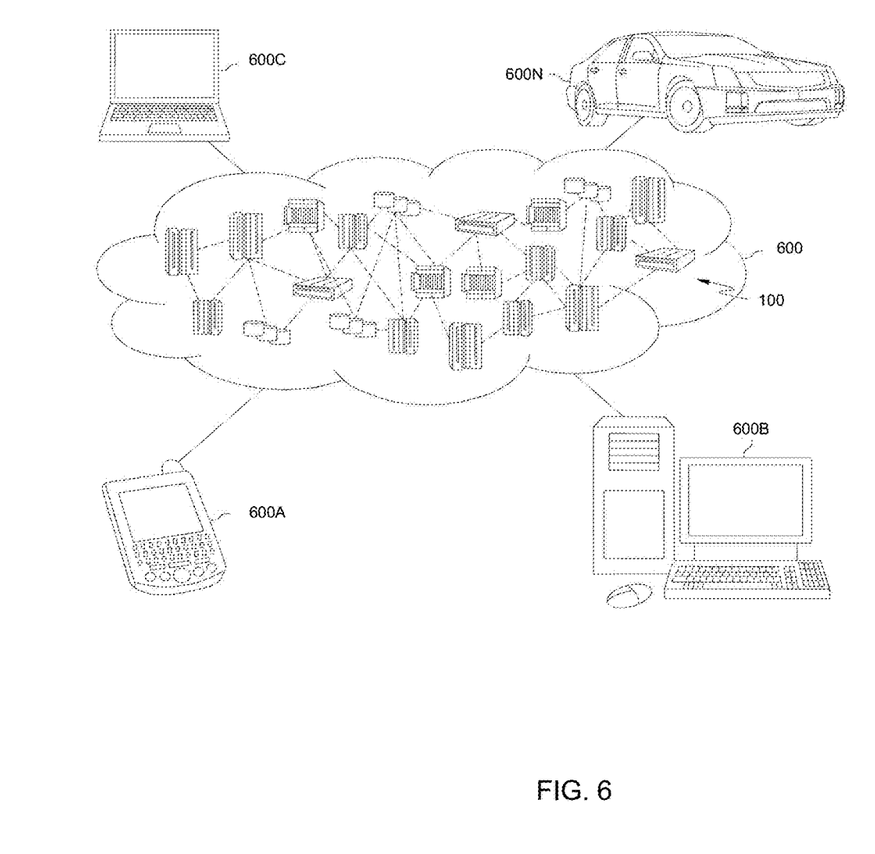
FIG. 6 is a block diagram of an illustrative cloud computing environment including the computer system depicted in FIG. 1, according to at least one embodiment.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
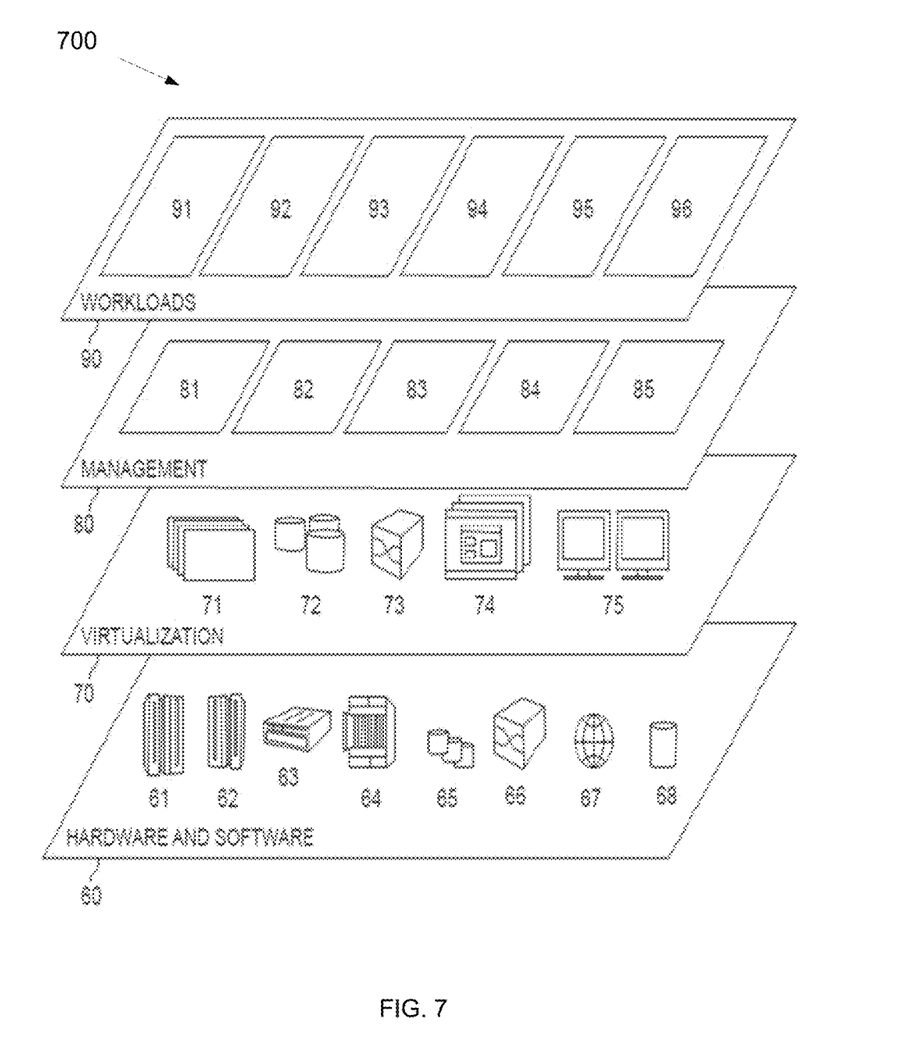
FIG. 7 is a block diagram of functional layers of the illustrative cloud computing environment of FIG. 6, according to at least one embodiment.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Self-calibration 96. A Self-calibration Program may enable automatic self-calibration of a static camera 102 (FIG. 1) from vehicle information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method to automatically calibrate a static camera in a vehicle, the method comprising:
   receiving, by a processor, a captured image file;
   detecting a plurality of vehicles in the captured image file;
   inferring a pose associated with each vehicle within the detected plurality of vehicles;
   inferring a height of the static camera and a tilt of the static camera to a ground plane based on the inferred pose associated with each vehicle within the detected plurality of vehicles and a variation in a projection of a 3D model of each vehicle within the detected plurality of vehicles;
   determining a 2D projected shape, size, location, direction of travel, and a plurality of features for each vehicle within the detected plurality of vehicles at more than one location in the captured image file based on the inferred height and tilt of the static camera;
   inferring a plurality of scene geometry associated with the captured image file, wherein the plurality of scene geometry is inferred based on the determined 2D projected shape, size, location, direction of travel, and the plurality of features of each vehicle within the detected plurality of vehicles as projected onto the captured image file; and
   calibrating the static camera based on the inferred plurality of scene geometry associated with the captured image file.

2. The method of claim 1, further comprising:
   estimating a size of a plurality of objects in the captured image file; and
   estimating a speed of the detected plurality of vehicles in the captured image file.

3. The method of claim 1, further comprising:
   estimating a plurality of distances travelled by each vehicle in the captured image file.

4. The method of claim 1, wherein the camera is a pin-hole camera and the captured image file comprises at least one of a camera feed, a video, a set of images, or a single image.

5. The method of claim 1, wherein detecting the plurality of vehicles in the captured image file includes the use of a standard Adaboost algorithm.

6. The method of claim 1, wherein determining the 2D projected shape, size, location, direction of travel, and the plurality of features for each vehicle within the plurality of detected vehicles at various locations in the captured image file includes the use of at least one of a vehicle detection, a background subtraction, an object classification, a feature-based tracking, a pose-dependent vehicle detection, and a foreground detection.

7. The method of claim 1, wherein detecting the plurality of vehicles in the captured image file comprises creating a bounding box in the captured image file together with the inferred pose associated with each vehicle.

8. The method of claim 7, wherein the inferred pose comprises determining a direction each vehicle is facing.

9. The method of claim 7, wherein creating the bounding box in the captured image file comprises taking each vehicle to rest horizontally on a ground plane and modelling each vehicle as a rectangular prism of a fixed fiducial size.

10. The method of claim 1, wherein determining the calibration comprises determining a height of the static camera, a focal length of the static camera, and an angle of the static camera.

11. A computer system to automatically calibrate a static camera in a vehicle the computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    receiving a captured image file;
    detecting a plurality of vehicles in the captured image file;
    inferring a pose associated with each vehicle within the detected plurality of vehicles;
    inferring a height of the static camera and a tilt of the static camera to a ground plane based on the inferred pose associated with each vehicle within the detected plurality of vehicles and a variation in a projection of a 3D model of each vehicle within the detected plurality of vehicles;
    determining a 2D projected shape, size, location, direction of travel, and a plurality of features for each vehicle within the detected plurality of vehicles at more than one location in the captured image file based on the inferred height and tilt of the static camera;
    inferring a plurality of scene geometry associated with the captured image file, wherein the plurality of scene geometry is inferred based on the determined 2D projected shape, size, location, direction of travel, and the plurality of features of each vehicle within the detected plurality of vehicles as projected onto the captured image file; and
    calibrating the static camera based on the inferred plurality of scene geometry associated with the captured image file.

12. The computer system of claim 11, further comprising:
    estimating a size of a plurality of objects in the captured image file; and
    estimating a speed of the detected plurality of vehicles in the captured image file.

13. The computer system of claim 11, further comprising:
    estimating a plurality of distances travelled by each vehicle in the captured image file.

14. The computer system of claim 11, wherein the camera is a pin-hole camera and the captured image file comprises at least one of a camera feed, a video, a set of images, or a single image.

15. The computer system of claim 11, wherein detecting the plurality of vehicles in the captured image file includes the use of a standard Adaboost algorithm.

16. The computer system of claim 11, wherein determining the 2D projected shape, size, location, direction of travel, and the plurality of features for each vehicle within the plurality of detected vehicles at various locations in the captured image file includes the use of at least one of a vehicle detection, a background subtraction, an object classification, a feature-based tracking, a pose-dependent vehicle detection, and a foreground detection.

17. The computer system of claim 11, wherein detecting the plurality of vehicles in the captured image file comprises creating a bounding box in the captured image file together with the inferred pose associated with each vehicle.

18. The computer system of claim 17, wherein the inferred pose comprises determining a direction each vehicle is facing.

19. The computer system of claim 17, wherein creating the bounding box in the captured image file comprises taking each vehicle to rest horizontally on a ground plane and modelling each vehicle as a rectangular prism of a fixed fiducial size.

20. A computer program product to automatically calibrate a static camera in a vehicle, the computer program product comprising:

one or more computer-readable storage devices and program instructions stored on at least one of the one or more tangible storage devices, the program instructions executable by a processor, the program instructions comprising:

program instructions to receive a captured image file;

program instructions to detect a plurality of vehicles in the captured image file;

program instructions to infer a pose associated with each vehicle within the detected plurality of vehicles;

program instructions to infer a height of the static camera and a tilt of the static camera to a ground plane based on the inferred pose associated with each vehicle within the detected plurality of vehicles and a variation in a projection of a 3D model of each vehicle within the detected plurality of vehicles;

program instructions to determine a 2D projected shape, size, location, direction of travel, and a plurality of features for each vehicle within the detected plurality of vehicles at more than one location in the captured image file based on the inferred height and tilt of the static camera;

program instructions to infer a plurality of scene geometry associated with the captured image file, wherein the plurality of scene geometry is inferred based on the determined 2D projected shape, size, location, direction of travel, and the plurality of features of each vehicle within the detected plurality of vehicles as projected onto the captured image file; and program instructions to calibrate the static camera based on the inferred plurality of scene geometry associated with the captured image file.

\* \* \* \* \*